United States Patent
Goldman

(10) Patent No.: US 9,344,798 B2
(45) Date of Patent: May 17, 2016

(54) TRANSFERRING OF AUDIO ROUTING IN A PREMISES DISTRIBUTION NETWORK

(71) Applicant: GN Netcom A/S, Ballerup (DK)

(72) Inventor: Tomasz Jerzy Goldman, Hellerup (DK)

(73) Assignee: GN Netcom A/S (DK)

( * ) Notice: Subject to any disclaimer, the term of this patent is extended or adjusted under 35 U.S.C. 154(b) by 96 days.

(21) Appl. No.: 14/368,621

(22) PCT Filed: Dec. 21, 2012

(86) PCT No.: PCT/EP2012/076758
§ 371 (c)(1),
(2) Date: Jun. 25, 2014

(87) PCT Pub. No.: WO2013/098262
PCT Pub. Date: Jul. 4, 2013

(65) Prior Publication Data
US 2014/0376737 A1    Dec. 25, 2014

(30) Foreign Application Priority Data
Dec. 30, 2011 (DK) .................................. 2011 01009

(51) Int. Cl.
*H04R 3/12* (2006.01)
*H04W 4/00* (2009.01)
*H04M 1/60* (2006.01)
*H04M 1/725* (2006.01)

(52) U.S. Cl.
CPC ............... *H04R 3/12* (2013.01); *H04M 1/6033* (2013.01); *H04M 1/6066* (2013.01); *H04M 1/6083* (2013.01); *H04M 1/7253* (2013.01); *H04W 4/008* (2013.01); *H04M 2250/02* (2013.01); *H04M 2250/04* (2013.01); *H04R 2420/07* (2013.01)

(58) Field of Classification Search
None
See application file for complete search history.

(56) References Cited

U.S. PATENT DOCUMENTS

| 2003/0100274 | A1 | 5/2003 | Brown |
| 2008/0269927 | A1 | 10/2008 | Szolyga et al. |
| 2009/0003620 | A1 | 1/2009 | McKillop et al. |
| 2009/0023417 | A1 | 1/2009 | Davis et al. |
| 2013/0282564 | A1* | 10/2013 | Sibbald ............ H04M 1/72525 705/39 |
| 2014/0155033 | A1 | 6/2014 | Lazaridus et al. |

FOREIGN PATENT DOCUMENTS

| GB | 2449229 | 11/2008 |
| JP | 2003047066 | 2/2003 |
| WO | WO 2005/029825 | 3/2005 |
| WO | WO 2006/051505 | 5/2006 |

* cited by examiner

*Primary Examiner* — Brenda Bernardi
(74) *Attorney, Agent, or Firm* — Altera Law Group, LLC

(57) ABSTRACT

A wireless audio rendering device, such as headset (2) or speaker phone (3), which audio rendering device (2, 3) is adapted to be paired with a wireless audio gateway device, such as a smart phone (1), whereby a first radio link (4) for transmitting audio can be established between the audio gateway (1) and the first audio rendering device (2). The first audio rendering device (2) is adapted to wirelessly recognize a second audio rendering device (3) also paired with the audio gateway device (1). When brought within an activation distance (D1-D3) of the second audio rendering device (3) the first audio rendering device (2) is adapted to initiate an audio transfer step, in which the first audio link (4) is replaced by a second radio link (5) for transmitting audio between the audio gateway (1) and the second audio rendering device (3). The invention also relates to a method of audio transferring and an audio rendering device for use with the method.

15 Claims, 3 Drawing Sheets

TRANSFERRING OF AUDIO ROUTING IN A PREMISES DISTRIBUTION NETWORK

TECHNICAL FIELD

The invention relates to a wireless audio rendering device, such as headset or speaker phone, which audio rendering device is adapted to be paired with a wireless audio gateway device, such as a smart phone, whereby a first radio link for transmitting audio can be established between the audio gateway and the first audio rendering device. The invention also relates to a method of audio transferring and an audio rendering device for use with the method.

BACKGROUND ART

Wireless communication devices are widely used today. Mobile phones, smart phones, tablet computers or the like are often wirelessly connected to audio rendering devices such as headsets, speaker phones, wireless speakers etc. in order to transfer the audio to and from an audio rendering device which is more convenient to use in the actual situation. F. ex. a user may use a headset or an in-car speakerphone while driving, as the hands are free for driving. Another example includes connecting a smart phone to a wireless speaker in order to share music with other persons. It is also an advantage to connect a wireless speaker to a tablet computer or laptop computer as the built in loudspeaker of these devices normally has a poor sound quality.

There are situations where the user of a Bluetooth headset wants to transfer audio to another audio rendering device. The following scenarios are typical examples:

Scenario 1: a user is talking on mobile phone using a headset, she then enters a car and would like to transfer audio to a portable speaker phone in the car.

Scenario 2: a user is talking on softphone using a headset and wants to switch audio to a speaker phone to enable her colleagues to participate in the conversation Today such scenarios require very cumbersome operations, like powering-down the active audio rendering device, and Bluetooth-connecting the new audio rendering device to the audio gateway.

DISCLOSURE OF INVENTION

According to the invention, the first audio rendering device is adapted to wirelessly recognise a second audio rendering device also paired with the audio gateway device, and whereby the first audio rendering device when brought within an activation distance of the second audio rendering device is adapted to initiate an audio transfer step, in which the first audio link is replaced by a second radio link for transmitting audio between the audio gateway and the second audio rendering device. In this way, it is very easy for a user to transfer audio, as it is not necessary to first disconnect the first audio rendering device and then connect the second audio rendering device.

The audio gateway device may comprise a Bluetooth transceiver whereby the radio link may comprise a Bluetooth synchronous connection-oriented (SCO) link.

The audio rendering device may comprise a Bluetooth Low Energy (BLE) transceiver and employ the Bluetooth Low Energy Proximity Profile to detect a proximate second audio rendering device and offering the user to define this audio rendering device as a peer device.

The Bluetooth standard provides three classes with different maximum permitted power transmission ranges: Class 1 has an approximate range of 100 meters, Class 2 10 meters and Class 3 about 1 meter. Class 2 is mostly used with mobile phones. Thus, the typical range between a smartphone and a headset is approximately 10 meters. The link between the two devices is normally maintained as long they are within range or the user does not actively disconnect the devices.

The activation distance may be based on received signal strength indication (RSSI), whereby at least one of the first and second audio rendering device must detect a received signal strength indication above a predetermined level, before the audio transfer step is initiated.

Alternatively, the activation distance D2, D3 may be based on bit error rate (BER), whereby at least one of the first and second audio rendering device must determine a bit error rate below a predetermined level, before the audio transfer step is initiated.

Alternatively, the first audio rendering device comprises a near field communication (NFC) circuit, whereby it can recognise a second audio rendering device also comprising a near field communication circuit.

The activation distance may defined by the Near Field Communication circuit. It may therefore be less than 10 cm, f. ex. less than 5 cm.

The audio transfer step may be initiated when the first and second audio rendering devices are brought within an activation distance of each other, which activation distance is less than 30 cm, preferably less 20 cm, most preferably less than 10 cm. If the activation distance is not too long, unintended audio transfer is less likely to occur. Also, power can be saved, if the devices only have to monitor other devices within a short distance.

According to an embodiment, the audio transfer step is initiated when the audio gateway device and one of the audio rendering devices are brought with an activation of each other, which activation distance is less than 30 cm, preferably less 20 cm, most preferably less than 10 cm. If the activation distance is not too long, unintended audio transfer is less likely to occur. In addition, power can be saved, if the devices only have to monitor other devices within a short distance.

The invention also relates to a wireless system comprising at least one audio gateway device, such as a smart phone, and at least a first and a second audio rendering devices as described above.

According to an embodiment, at least two of the three devices comprise a microphone, and the audio transfer step is initiated when the two devices comprising a microphone are bumped against each other, whereby the two microphones detect a bumping noise at the same point in time.

According to another embodiment, the audio transfer step includes an activation of a motion sensor of at least the audio gateway device or one of the audio rendering devices. Thus, the user may for example move the device in a certain matter in order to start the audio transfer step or confirm audio transfer.

According to an embodiment, activation of the motion sensor may include shaking at least the audio gateway device or one of the audio rendering devices.

According to an embodiment, at least two of the three devices comprise a motion sensor, and the audio transfer step is initiated when the two devices comprising a motion sensor are bumped against each other, whereby the two motion sensors detect a motion at the same point in time.

According to an embodiment, the audio transfer step must be confirmed by a further user inter action, such as a button press. Thus, the audio transfer step may for example be illustrated on a display of the audio gateway device and require a button press or a soft button touch, before the audio transfer step is executed.

The invention also relates to a method of transferring audio routing in a premises distribution network, comprising at least one audio gateway device, such as a smart phone, and at least first and second audio rendering devices, such as a wireless headset and a speaker phone, and wherein a first radio link for transmitting audio is established between the audio gateway and the first audio rendering device, characterised in that audio rendering devices are adapted to recognise each other and are brought within an activation distance of each other to initiate an audio transfer step, in which the first audio link is replaced by a second radio link for transmitting audio between the audio gateway and the second audio rendering device.

BRIEF DESCRIPTION OF THE DRAWINGS

The invention is explained in detail below with reference to the drawing illustrating preferred embodiments of the invention and in which.

Figure 1:
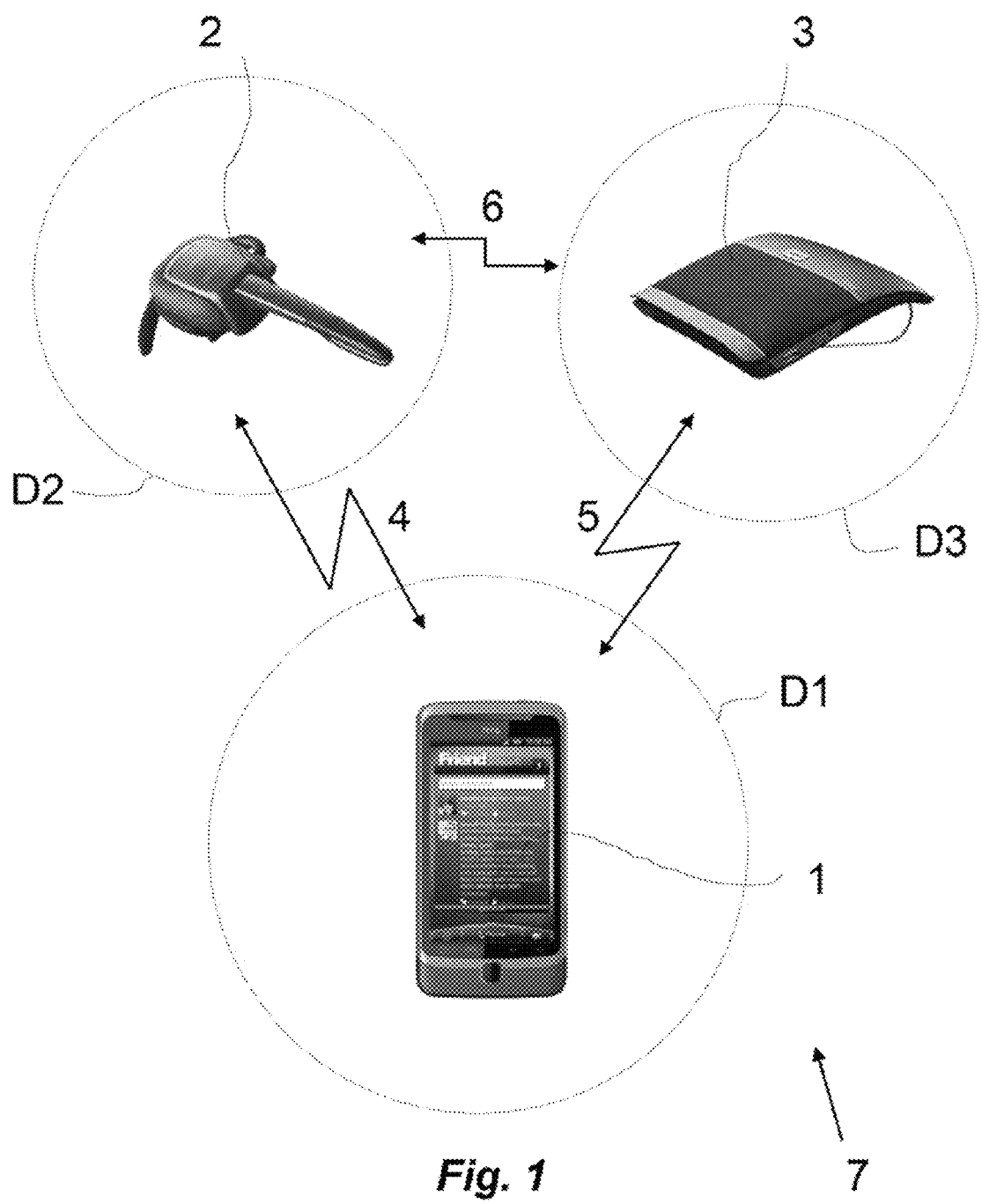
FIG. 1 is a schematic view of a preferred embodiment of system according to the invention.

The following reference signs are used in the figures and the following detailed description of the preferred embodiment.

1 smart phone
2 headset
3 speaker phone
4 first audio link
5 second audio link
6 radio link
7 system
D1 activation distance
D2 activation distance
D3 activation distance

MODES FOR CARRYING OUT THE INVENTION

FIG. 1 discloses a system comprising a smart phone 1, a headset 2 and a speaker phone 3. The speaker phone 3 may be placed in a car. All the three devices are Bluetooth enabled, which means that they can be interconnected according to the Bluetooth standard. The headset 2 is paired with the smart phone 1, whereby a first Bluetooth link 4 can be established between the two devices. Also, the speaker phone 3 is paired with the smart phone 1 whereby a second Bluetooth link 5 can be established between the two devices.

The headset 2 and the speaker phone 3 are paired so that they "know" each other. This is employed by means of the so-called Bluetooth Low Energy Proximity Profile. Both the headset 2 and the speaker phone 3 are Bluetooth Low Energy enabled and the user has defined them as "peer devices". Thus, a radio link 6 is automatically established between headset 2 and the speakerphone 3, when their Bluetooth radio modules can reach each other. This means, that the link 6 is maintained as long as they are not more than 10 meters apart. Only one audio channel is open at a given time. This means, that only the headset 2 or the speaker phone 3 can send/receive audio to/from the smart phone 1 at a given time. Each of the devices 1, 2, 3 has an activation distance D1, D2, D3, the function of which will be explained in the following. If the user wants to change audio routing from the headset 2 to the speaker phone 3, he moves the headset 2 so close to the speaker phone 3, that the speaker phone 3 is within the headset's 2 activation distance D2 and the headset 2 is within the speaker phone's 3 activation distance D3. Hereby, the headset 2 sends information about the smart phone 1 (Bluetooth address, on-call state etc.) to the speaker phone 3. The audio link 4 between the headset 2 and the smart phone 1 is terminated, and an audio link 5 between the speaker phone 3 and the smart phone 1 is established. In this way, the user can continue his phone conversation with hardly any noticeably interruption.

Figure 2:
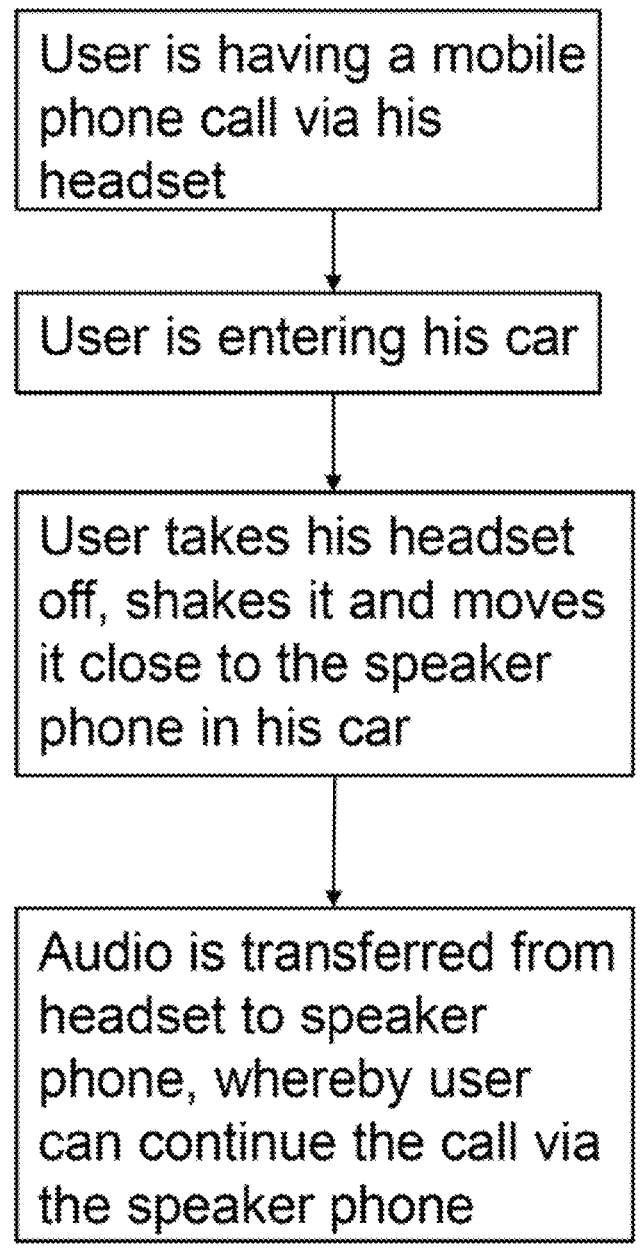
FIG. 2 is a block diagram showing an example of a method according to the invention.

FIG. 2 discloses a process according to another embodiment, where the audio routing is transferred from between mobile phone and headset to between mobile phone and speaker phone. The audio transfer step comprises the two last boxes. In this embodiment, the headset is provided with a motion sensor. The headset must be shaken and brought within activation distance in order to establish the audio transfer.

Figure 3:
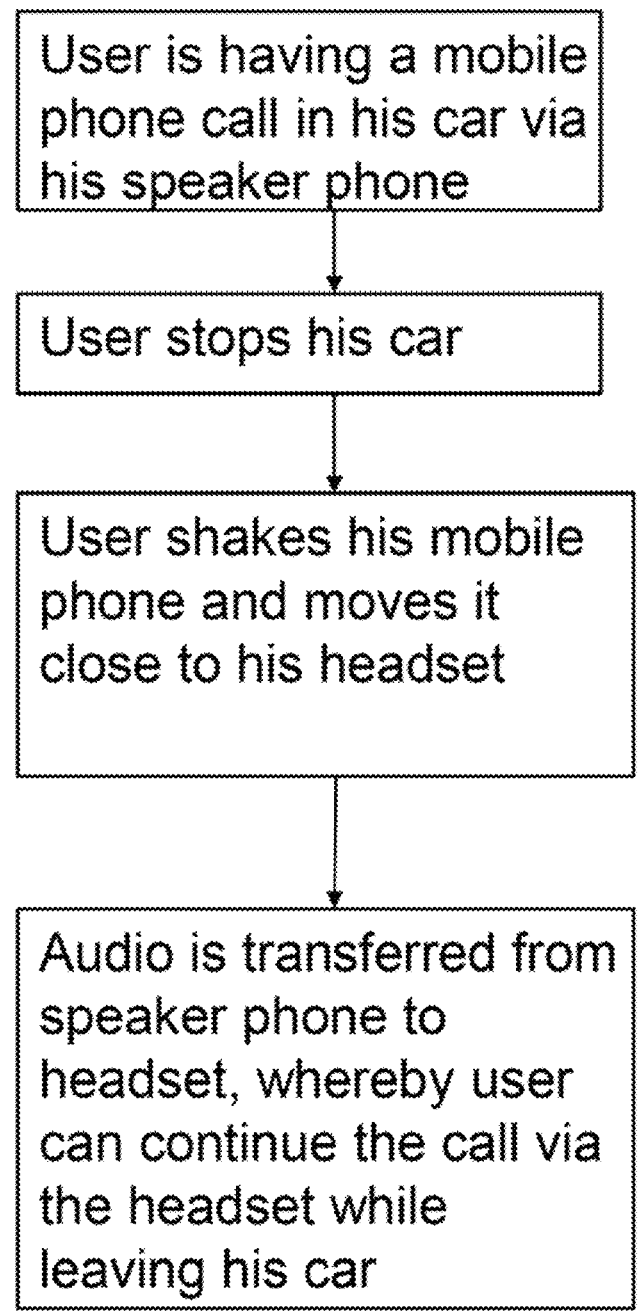
FIG. 3 is a block diagram showing another example of a method according to the invention.

FIG. 3 discloses a process according to a third embodiment, where the audio routing is transferred from between mobile phone and speaker phone to between mobile phone and headset. The audio transfer step comprises the two last boxes. In this embodiment, the user must shake the mobile phone and move it close to the headset in order to establish the audio transfer. Most of modern mobile phones are smart phones comprising a motion sensor.

Other sensors may be used in the audio transfer steps, such as an orientation sensor.

In a not shown embodiment a confirmation request may pop up on the display of the mobile phone, where the user must confirm that he wishes the audio transfer.

The activation distances D1, D2 and D3 may be based on received signal strength indication (RSSI).

The audio rendering device may be programmed to recognize other audio rendering devices programmed in the same way as peers.

Instead of Bluetooth Low Energy, mutual recognition of the audio rendering devices may be based on near field communication (NFC). This requires, that the audio rendering devices are provided with NFC circuits. Also the audio gate way device may be NFC enabled, There are other uses of proximity sensing to control audio rendering or pickup:
  Moving headset close to audio gateway device could trigger transfer of audio between headset and mobile phone; moving headset again close to audio gateway could move the audio back to headset—all of this could be controlled by headset using Handsfree Profile
  A portable Bluetooth microphone could be used with a speakerphone such that speakerphone could use either built-in or portable microphone; microphone pickup could be determined by proximity.

The invention claimed is:
1. A wireless first audio rendering device, which first audio rendering device is adapted to be paired with a wireless audio gateway device, whereby a first radio link for transmitting audio can be established between the audio gateway device and the first audio rendering device wherein the first audio rendering device is adapted to wirelessly recognise a second audio rendering device also paired with the audio gateway device, and whereby the first audio rendering device when brought within an activation distance of the second audio rendering device is adapted to initiate an audio transfer step, in which the first radio link is replaced by a second radio link for transmitting audio between the audio gateway device and the second audio rendering device.

2. A wireless first audio rendering device according to claim 1 comprising a Bluetooth transceiver whereby the first and second radio links may comprise a Bluetooth synchronous connection-oriented (SCO) link.

3. A wireless first audio rendering device according to claim 1, comprising a Bluetooth Low Energy (BLE) transceiver and employing the Bluetooth Low Energy Proximity Profile to detect the second audio rendering device and offering the user to define this audio rendering device as a peer device.

4. A wireless first audio rendering device according to claim 1, wherein the activation distance is based on received signal strength indication (RSSI), whereby at least one of the first and second audio rendering device must detect a received signal strength indication above a predetermined level, before the audio transfer step is initiated.

5. A wireless first audio rendering device according to claim 1, wherein the activation distance is based on bit error rate (BER), whereby at least one of the first and second audio rendering devices must determine a bit error rate below a predetermined level, before the audio transfer step is initiated.

6. A wireless first audio rendering device according to claim 1, wherein the first audio rendering device further comprises a first near field communication circuit, whereby it can recognize the second audio rendering device comprising a second near field communication circuit.

7. A wireless first audio rendering device according to claim 1, wherein the activation distance is defined by the first near field communication circuit and the second near field communication circuit.

8. A wireless first audio rendering device according to claim 1, wherein the activation distance is less than 30 cm.

9. A wireless first audio rendering device according to claim 1, wherein the audio transfer step also is adapted to be initiated when the audio gateway device and one of the audio rendering devices are brought within a second activation distance of each other, the second activation distance is less than 30 cm.

10. A wireless first audio rendering device according to claim 1, wherein at least two of the three devices comprise a microphone, and wherein the audio transfer step is initiated when the two devices comprising a microphone are bumped against each other, whereby the two microphones detect a bumping noise at the same point in time.

11. A wireless first audio rendering device according to claim 1, wherein the audio transfer step includes an activation of a motion sensor of at least the audio gateway device or one of the audio rendering devices.

12. A wireless first audio rendering device according to claim 11, wherein the activation of the motion sensor includes shaking at least the audio gateway device or one of the audio rendering devices.

13. A wireless first audio rendering device according to claim 1, wherein at least two of the three devices comprise a motion sensor, and wherein the audio transfer step is initiated when the two devices comprising a motion sensor are bumped against each other, whereby the two motion sensors detect a motion at the same point in time.

14. A wireless system comprising at least one audio gateway device and a first audio rendering device adapted to be paired with the at least one wireless audio gateway device, whereby a first radio link for transmitting audio can be established between the at least one audio gateway device and the first audio rendering device, wherein the first audio rendering device is adapted to wirelessly recognise a second audio rendering device also paired with the at least one audio gateway device, and whereby the first audio rendering device when brought within an activation distance of the second audio rendering device is adapted to initiate an audio transfer step in which the first radio link is replaced by a second radio link for transmitting audio between the at least one audio gateway device and the second audio rendering device.

15. A method of transferring audio routing in a premises distribution network, comprising at least one audio gateway device, and at least first and second audio rendering devices, comprising the steps of:
   establishing a first radio link for transmitting audio between the at least one audio gateway device and the first audio rendering device;
   providing device recognition between the audio rendering devices and the at least one audio gateway devices;
   bringing the audio rendering devices within an activation distance of each other;
   initiating an audio transfer in which the first radio link is replaced by a second radio link for transmitting audio between the at least one audio gateway device and the second audio rendering device.

* * * * *